(12) United States Patent
Kawan

(10) Patent No.: US 6,422,459 B1
(45) Date of Patent: Jul. 23, 2002

(54) METHOD AND SYSTEM FOR OFF-LINE LOADING OF STORED VALUE CARDS USING A BATCH-LOAD TERMINAL

(75) Inventor: Joseph C. Kawan, Hollywood, CA (US)

(73) Assignee: Citicorp Development Center, Inc., Los Angeles, CA (US)

( * ) Notice: Subject to any disclaimer, the term of this patent is extended or adjusted under 35 U.S.C. 154(b) by 0 days.

(21) Appl. No.: 09/170,900

(22) Filed: Oct. 13, 1998

Related U.S. Application Data

(60) Provisional application No. 60/061,864, filed on Oct. 15, 1997.

(51) Int. Cl.[7] .................................................. G06K 5/00
(52) U.S. Cl. ........................ 235/380; 235/375; 705/41; 705/66
(58) Field of Search ................................ 235/375, 379, 235/380, 492; 705/41, 44, 66, 67

(56) References Cited

U.S. PATENT DOCUMENTS

| | | | |
|---|---|---|---|
| 4,992,646 A | | 2/1991 | Collin ........................ 235/375 |
| 5,294,782 A | * | 3/1994 | Kumar ................... 235/462.01 |
| 5,396,558 A | * | 3/1995 | Ishiguro et al. ............... 705/67 |
| 5,440,634 A | | 8/1995 | Jones et al. ................... 380/24 |
| 5,744,787 A | * | 4/1998 | Teicher ........................ 235/380 |
| 5,796,832 A | * | 8/1998 | Kawan ........................ 380/24 |
| 5,884,292 A | * | 3/1999 | Baker et al. ............. 235/375 X |
| 5,917,168 A | * | 6/1999 | Nakamura et al. .......... 235/379 |
| 5,936,221 A | * | 8/1999 | Corder et al. ............... 235/380 |
| 6,070,795 A | * | 6/2000 | Feiken ........................ 235/380 |
| 6,298,336 B1 | * | 10/2001 | Davis et al. ................... 705/41 |

FOREIGN PATENT DOCUMENTS

| | | | |
|---|---|---|---|
| EP | 0 700 024 A1 | 3/1996 | ............. G07F/7/10 |
| JP | 2-205993 | * 8/1990 | |
| WO | WO 96/09592 | 3/1996 | ........... G06F/17/60 |
| WO | WO 98/18107 | 4/1998 | ............. G07F/7/08 |

OTHER PUBLICATIONS

European Search Report for Application No. EP 98203434.0, dated Mar. 5, 2002.

* cited by examiner

Primary Examiner—Michael G. Lee
Assistant Examiner—Jared J. Fureman
(74) Attorney, Agent, or Firm—George T. Marcou; Kilpatrick Stockton LLP

(57) ABSTRACT

A method and system for batch loading a stored value application of a microprocessor based stored value card includes a stored value card reader/writer connected to a local computer device and a batch-load application running on the same computer device which securely stores load key information and emulates the remote functions of an on-line load transaction. The computer also has a security module for storing load key information and an encryption device. Communication is initiated on the card reader at the local computer device between the stored value application and the batch-load application, and an off-line batch-load transaction is performed in which the load key information is validated and a funding source is also validated. An authorizing message is sent by the batch-load application to the stored value application with data representing a preselected monetary value.

37 Claims, 7 Drawing Sheets

METHOD AND SYSTEM FOR OFF-LINE LOADING OF STORED VALUE CARDS USING A BATCH-LOAD TERMINAL

CROSS REFERENCE TO RELATED APPLICATIONS

This application claims priority to applicant's copending application having U.S. Ser. No. 60/061,864 filed Oct. 15, 1997.

FIELD OF THE INVENTION

The present invention relates generally to the field of stored value cards and more particularly to a method and system for batch loading of microprocessor based stored value cards off-line using a batch-load terminal.

BACKGROUND OF THE INVENTION

A prepaid stored value card contains stored value which the user of the card can spend with a retailer. A card issuer receives money from a consumer in advance and stores corresponding value on the stored value card. After the retailer accepts stored value from the card, the retailer is reimbursed with actual money by the card issuer. Generally, a stored value card is a plastic card the size of a credit card that is embedded with either a microprocessor and a memory chip or only with a memory chip with non-programmable logic. The card embedded with the microprocessor is capable of adding, deleting, and otherwise manipulating information on the card. The chip in a memory chip only card consists only of storage and a little extra hardware that prevents access to the stored data unless, for example, certain stored passwords or PIN's are input correctly. The memory chip only card can only undertake a pre-defined operation. Memory chip only cards represent the bulk of stored value cards currently on offer, primarily for pre-paid, disposable card applications such as pre-paid phone cards.

Memory chip only based cards are non-reloadable, have a very limited card lifetime, and are therefore disposable. On the other hand, microprocessor based cards are typically reloadable. Therefore, they potentially have a much longer card lifetime and are not generally considered to be disposable. The security associated with the use of memory cards is not nearly as good as the security that is available with microprocessor cards. With some cards, it is relatively simple to defraud a memory based stored value card. For example, a computer device can be used to intercept and record secret information communicated during a transaction with the memory card and can then be used to play the role of the memory card in other transactions. Further, memory cards have been in use for a relatively long time, and disposable memory card security has remained stationary during that time. However, there are now next generation cards available that provide higher security. It is axiomatic that the longer security remains stationary, the more susceptible the security becomes to being compromised.

Microprocessor based cards offer greater memory storage and security of data and can also process data on the card. Microprocessor cards typically have cryptography built in, which makes use of secret keys. Thus, microprocessor cards offer far more security than memory based cards. Moreover, microprocessor cards can be reloaded. Therefore, they can be issued without value. Since memory cards are non-reloadable, they must be issued with value on them. When stored value cards are issued with value on them, they are equivalent to cash. Thus, the same elaborate security and audit measures employed to transport, store, and dispense cash must be used to transport, store, and dispense memory cards.

It is not necessary to employ these elaborate security measures with microprocessor based reloadable cards issued without value. Microprocessor based reloadable cards can be loaded on-line using a load key kept in a remote processor for security reasons. However, the on-line load transaction is time consuming and requires costly infrastructure.

There is a current need to provide a method and system for batch loading microprocessor based stored value cards off-line using a batch-load terminal, which eliminates the need for expensive infrastructure costs associated with on-line loading transactions. There is a further need to provide a method and system for batch loading microprocessor based stored value cards for use as disposable cards, but with all the security afforded by microprocessor based cards.

SUMMARY OF THE INVENTION

It is a feature and advantage of the present invention to provide a method and system for batch loading microprocessor based stored value cards using a batch-load terminal which eliminates the infrastructure costs associated with on-line loading.

It is a further feature and advantage of the present invention to provide a method and system for batch loading microprocessor based smart cards for use as disposable cards with all the security of a microprocessor based card.

In an embodiment of the present invention, a reloadable microprocessor based card is batch loaded off-line using a batch-load terminal. The loading process for a microprocessor card can be done on-line for security reasons. In order to maintain security, the secrecy of the load key is closely guarded, and it is located in a remote processor. Therefore, loading reloadable microprocessor cards on-line is time consuming and ties up systems and infrastructure. Thus, it is advantageous to carry out the load process off-line. In order to load microprocessor based cards off-line in a secure way, it must be done in a secure location. The secret load key that is normally kept in the remote processor is put into a decryption device at a local batch-load terminal. In this way, the load process can be carried out securely at the local batch-load terminal.

In an embodiment of the present invention, a microprocessor based card is initialized with a load key with or without storing value on the card. Cards which are initialized without value are loaded with value on the batch-load terminal. Load information for the batch-load terminal transaction is logged in a transaction log. When the cards are sold, funding information is provided to a funding system of the financial institution. The load key is either a standard load key which allows successive reloading or a special load key which prevents reloading of the card after the original value is used. Thus, the card with the special load key is a disposable microprocessor based stored value card.

In an embodiment of the present invention, effectively, the disposable microprocessor card has a starting value on it. Once the value is used up, it cannot be reloaded by normal means. Therefore, the disposable microprocessor card has all the security advantages of a reloadable card and none of the disadvantages of a disposable memory based card. The microprocessor based card with the special load key is thus a disposable card which can be used by collectors in the same way disposable memory based stored value cards are currently used, or for any other purpose for which disposable memory cards are presently used.

To achieve the stated and other features, advantages and objects, an embodiment of the present invention provides a method and system for batch loading the stored value application of a stored value card microprocessor. Communication is initiated on a stored value card reader at a local terminal between the stored value application and a batch-load application residing on the local terminal. A request for a load transaction is transmitted for the stored value application to the batch load application, and the batch-load application authorizes the load transaction in response to the request. The stored value application and the batch-load terminal include secret load key information for the load transaction.

In an embodiment of the present invention, the load key information is stored securely in a security module on the local terminal. The local terminal is a computer, for example a personal computer, at a financial institution, such as a bank. The batch-load application also includes an encryption device and a CD-ROM for security purposes. The request for the load transaction includes a request from the stored value application to the batch-load application to load a preselected monetary value to the stored value application. The request is transmitted from the stored value application to the batch-load application as an encrypted message and includes the load key information. The batch-load application decrypts the encrypted message and validates the load key information. The batch load application also confirms a funding source, such as the financial institution, and transmits an authorizing message to the stored value application, including data representing the pre-selected monetary value. The authorizing message also includes, for example, load key information and card serial number information.

In an embodiment of the present invention, before batch-loading the stored value card, the stored value application is initialized by unlocking the application with transport key information. The transport key information is exchanged for the load key information, which may be a reloadable load key that allows successive reloading or a non-reloadable load key which cannot be reloaded after the original loading of stored value. After the load transaction is authorized, the transaction is confirmed by the stored value application transmitting a load completion message to the batch-load application. The batch load application collects data about the load transaction from the messages communicated between the stored value application and the batch-load application and logs the data in a load transaction log. The batch-load application also generates the load transaction log to a stored value card load transaction file and transmits the file to the card system provider and the funding source, such as the financial institution.

In an embodiment of the present invention, the system components include a stored value card reader/writer, which can read and write to the stored value application and which is connected to the financial institution's personal computer. The batch-load application runs on the same personal computer, which is also has a security module for storing the load key information, as well as an encryption device. The batch-load application includes a methodology for collecting the messages transmitted between the stored value application and the batch load application as load transaction data and for generating log files of the load transaction data to the system provider and the funding source. A card feeder mechanism is provided to load cards automatically to the card reader/writer from a feed hopper. A collection hopper is provided to collect the cards after loading, and a reject hopper is provided to collect rejected cards.

Additional objects, advantages and novel features of the invention will be set forth in part in the description which follows, and in part will become more apparent to those skilled in the art upon examination of the following, or may be learned by practice of the invention.

DETAILED DESCRIPTION

Figure 1:
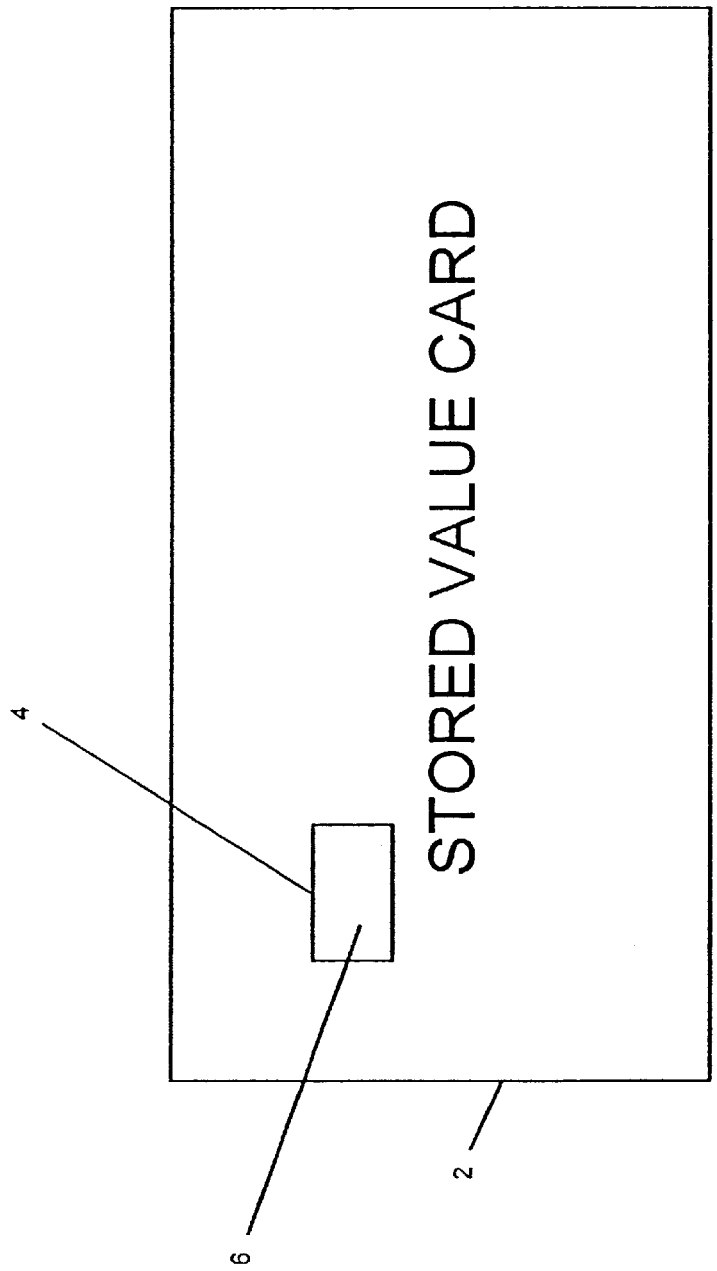
FIG. 1 shows a stored value card embedded with a microprocessor chip for an embodiment of the present invention.

Referring now in detail to an embodiment of the invention, an embodiment of which is illustrated in the accompanying drawings, FIG. 1 shows a microprocessor based stored value card 2 embedded with a microprocessor chip 6 for an embodiment of the present invention. Artwork for the microprocessor card 2 is developed and supplied to a plastics manufacturer which manufactures the card. The plastics manufacturer is also supplied with appropriate ISO specifications to assure that the card 2 meets ISO standards, including module positioning per ISO 7816 specification. Likewise, standards for chip imbedding are provided. The plastics manufacturer prints the plastic out as the completed card 2. A hole 4 is milled into card 2, and a microprocessor chip module 6 is embedded in the card. The chip 6 is essentially inserted in the hole 4 and glued in place. The card 2 now has an operating system, and it has a stored value application either in soft mask or hard mask on the chip module 6. At this point, the module 6 does not have a load key or a purchase key or a card serial number, but instead is locked with a transport key.

In an embodiment of the present invention, after being embedded with microprocessor 6, card 2 is sent to a financial institution, such as a bank, for initialization with secret keys, including a load key. After the card 2 has been initialized, it has no substantial value associated with it. In this way, the cards can be initialized at a centrally located remote location and transported to a loading location, which is close to the area in which they are to be used, without the necessity of using, for example, an expensive armored carrier transport. Rather, after initialization and before loading value, the cards can be shipped by regular delivery service, such as UPS. The cost of the chip 6 is only about $2.50, and after the initialization cost, the card 2 has only about $3.50 of cost associated with it. While this represents some value in cost, it is not value that can be used by an outside party, because it is necessary to store value on the card 2 in order to actually use it, which is an advantage of loading the card later.

In an embodiment of the present invention, the secret keys with which card 2 is initialized are furnished by the system provider, such as VISA. The transport key allows the financial institution to open up microprocessor 6 so that it can be read and written to. The load key is put into microprocessor 6. The load key is generated under information also provided by the system provider. The load key is very important and must be kept secure. The load key is generated in a three part form and put together in a terminal that is resident in the initialization area within the financial institution. The financial institution is also provided with a range of serial numbers by the system provider, from which the financial institution selects a serial number sequence for a card serial number. A purchase key is also supplied by the system provider. The purchase key allows card 2 to operate in a purchase terminal or merchant terminal.

Figure 2:
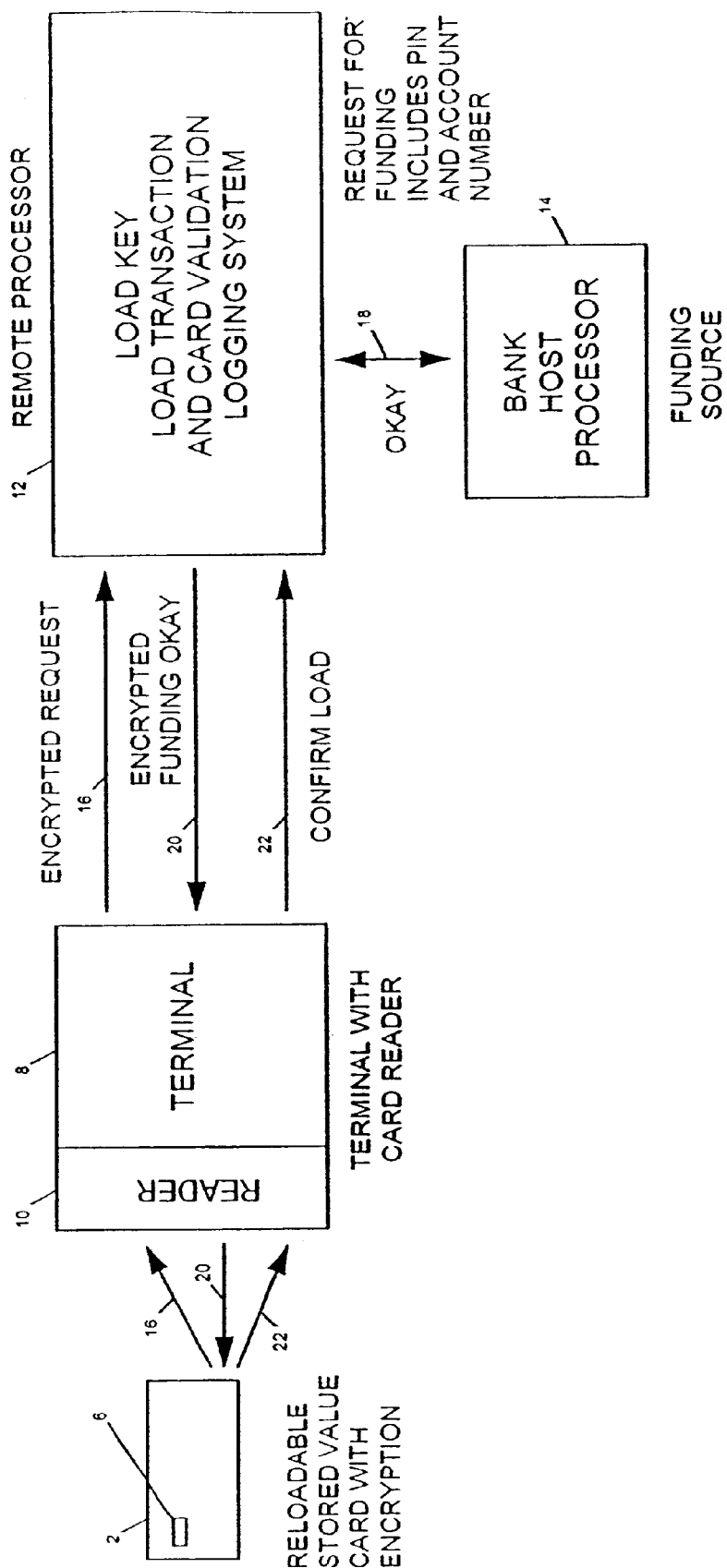
FIG. 2 is a flow chart which illustrates the components and flow of information between the components for an on-line process of loading reloadable microprocessor stored value cardS.

In an embodiment of the present invention, the batch load terminal provides a mechanism for batch loading microprocessor card 2 which emulates an on-line loading process for loading reloadable microprocessor cards. FIG. 2 is a schematic flow chart which illustrates the components and the flow of information between the components for the on-line loading of reloadable microprocessor based stored value cards. In loading reloadable card 2, a value is selected, and the value is presented to the card essentially in messages generated between the components. Referring to FIG. 2, the on-line loading process makes use of a terminal 8 with a card reader 10, a remote transaction and card validation system 12, and a funding source, such as a bank processor 14. In the on-line loading process, an encrypted request message 16 with the selected value is sent from microprocessor 6 of card 2 to the remote processor 12, where the message is decrypted. The card 2 is validated, and a funding source is also validated at 18 with bank processor 14. An encrypted authorizing message 20 is generated at the remote location 12 authorizing the load that goes directly to the microprocessor 6 of card 2, and the card is loaded with the value. A message 22 confirming that card 2 has been loaded is returned by the microprocessor 6 to the remote location 12.

Figure 3:
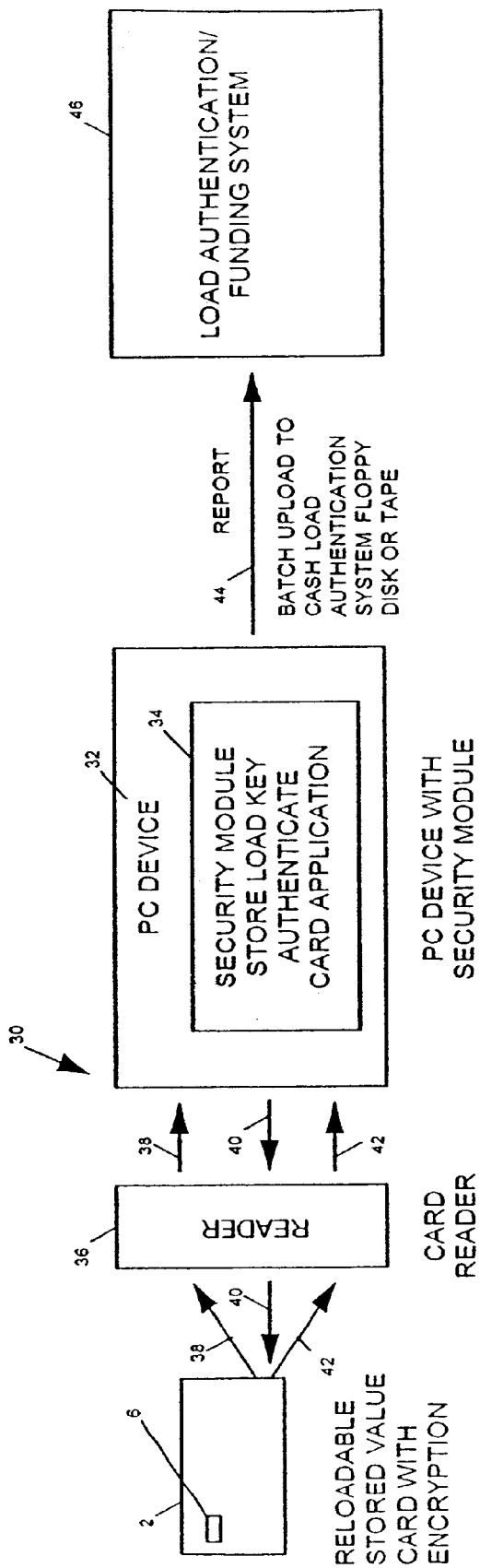
FIG. 3 is a flow chart which shows an overview of the key components and illustrates the flow of information between the components for the off-line batch-loading loading of stored value cards for an embodiment of the present invention.
Figure 4:
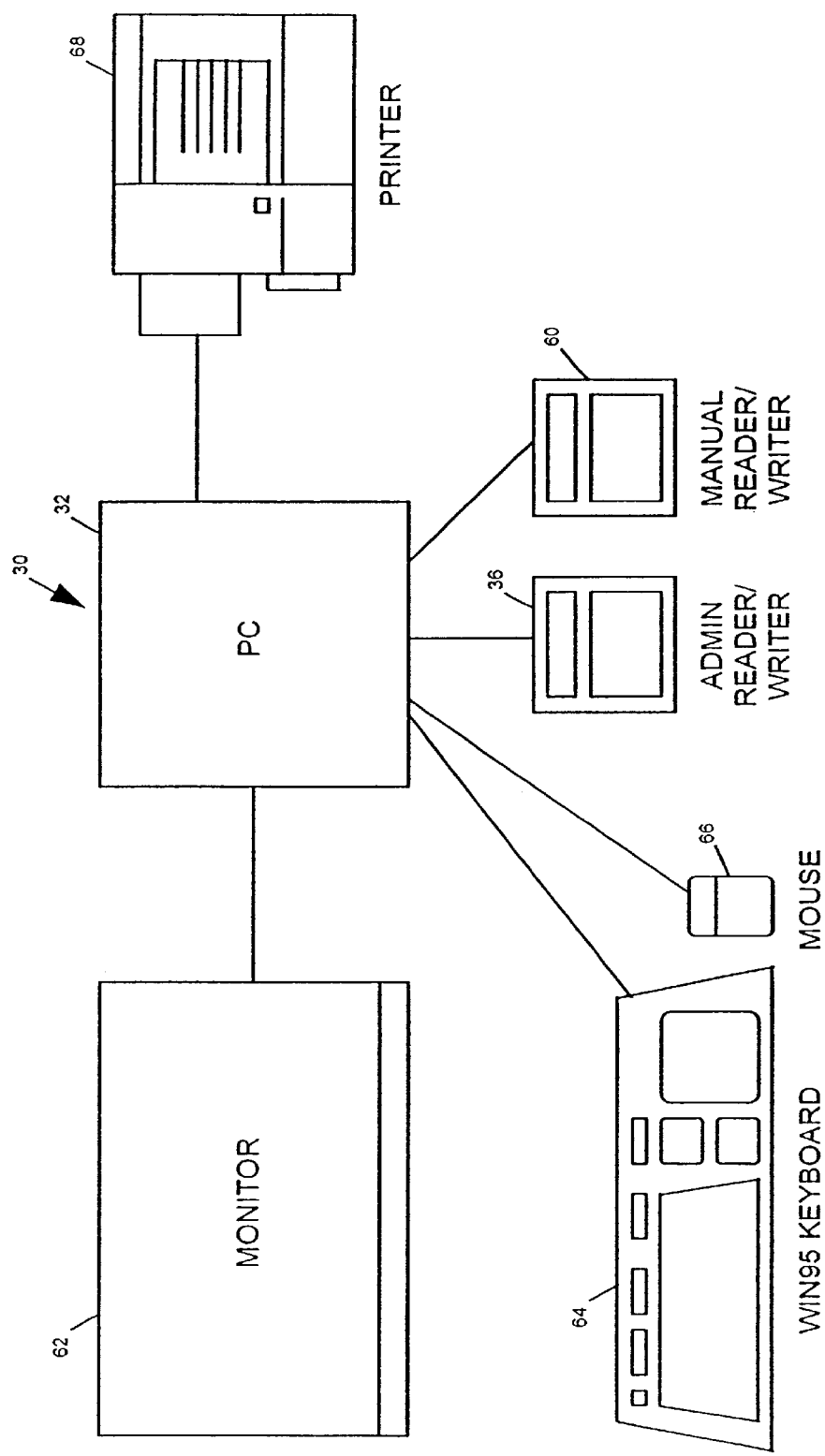
FIG. 4 is a somewhat schematic diagram which provides further detail regarding the key components shown in FIG. 3 for a embodiment of the present invention.

FIG. 3 is a flow chart which shows an overview of the key components for an embodiment of the present invention and illustrates the flow of information between the components. Referring to FIG. 3, the batch-load terminal, shown generally as 30, uses a computer application of a financial institution's local PC device 32 which emulates the on-line load process for an embodiment of the present invention. The PC device 32 is used in combination with a secure decryption device or module 34, for example, as an attachment or a plug board. FIG. 4 is a somewhat schematic diagram which provides further detail regarding the key components for an embodiment of the present invention. In addition to PC device 32, batch load terminal 30 also includes a card reader/writer 60 and a stored value card reader/writer 36, a monitor 62, a keyboard 64, a mouse 66 and a printer 68. Terminal 30 is located locally in a secured financial institution facility, and the application program on local PC device 32 is used to simulate the remote functions of the on-line load process. The secret load key is supplied by the system provider and stored in the security module 34 on the local PC device 32 of the financial institution. The computer application on PC device 32 includes a methodology which collects all messages between the components, including request message 38, authorization message 40, and load confirmation message 42. Load confirmation message 42 is collected as the confirmation that card 2 has been loaded. Log files of load transaction information are generated at 44 for the system provider and financial institution at 46.

In an embodiment of the present invention, for security reasons, the batch-load terminal applications, including utilities, require a CD-ROM to be installed in the local PC device 32 of batch-load terminal 30. The software is implemented not to run from any device other than the CD-ROM and requires the decrypting device 34 to be installed in PC device 32. The application resides on a CD-ROM and runs only from the CD-ROM. The CD-ROM can be removed and stored securely when batch-load terminal 30 is not in use. For example, batch load terminal 30 uses a Windows NT 4.0 Workstation configured to permit operation only when the CD-ROM is installed and two keys have been entered using passwords encrypted by encryption device 34. The processing of stored value cards is logged in a transaction log. The log is sent to a smart card file entity for adding stored value card data to a smart card file. The smart card file provides a database containing the information required to send funding and load advice messages at 44. When stored value cards are issued, for example, to merchants or customers, notice is sent to the load authorization and funding systems 46.

In an embodiment of the present invention, the software mechanism is used to load the card 2 locally using only the financial institution's local PC device 32, with the decryption or security device 34 to store the load key and the computer program to emulate the on-line load. Information is then presented to the financial system at 44 to confirm that card 2 has been activated with value. It is necessary to present the information confirming that card 2 has been activated with value, because there is a funding risk or liability against the financial institution. In other words, although card 2 is loaded, the card may not be active. Once card 2 is loaded, activation is confirmed by attaching the single card reader 60 to the financial institution PC device 32 and manually loading stored value cards, one at a time. The confirmation process is automated with readily available equipment which provides a transport mechanism that takes a single smart card 2 and moves it into a read/write location and writes information or reads information and then ejects the card.

Figure 5:
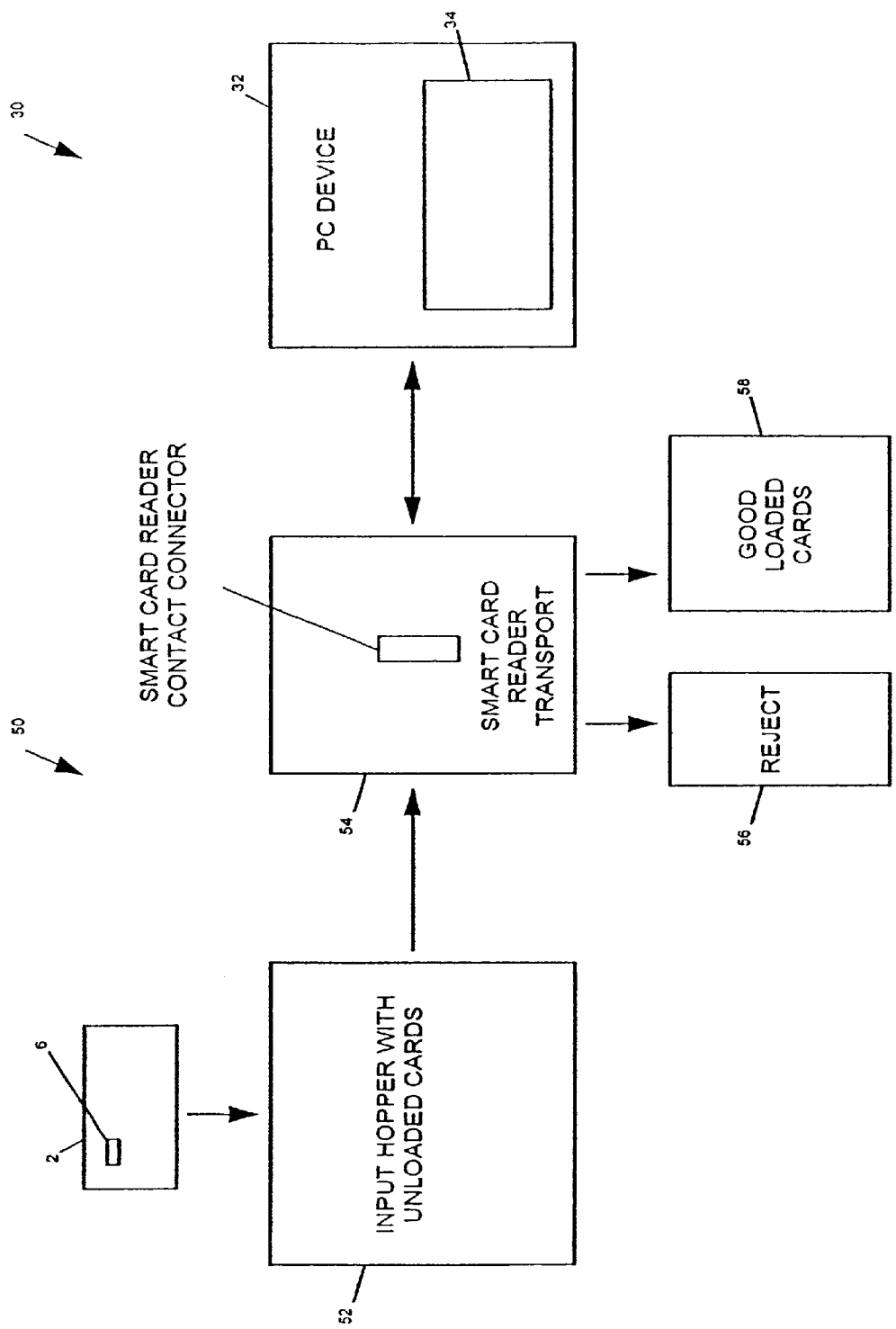
FIG. 5 is a flow chart which amplifies the flow of information shown in FIG. 3 and provides further detail regarding the process of a transport mechanism automatically feeding stored value cards for off-line batch loading for an embodiment of the present invention.
Figure 6:
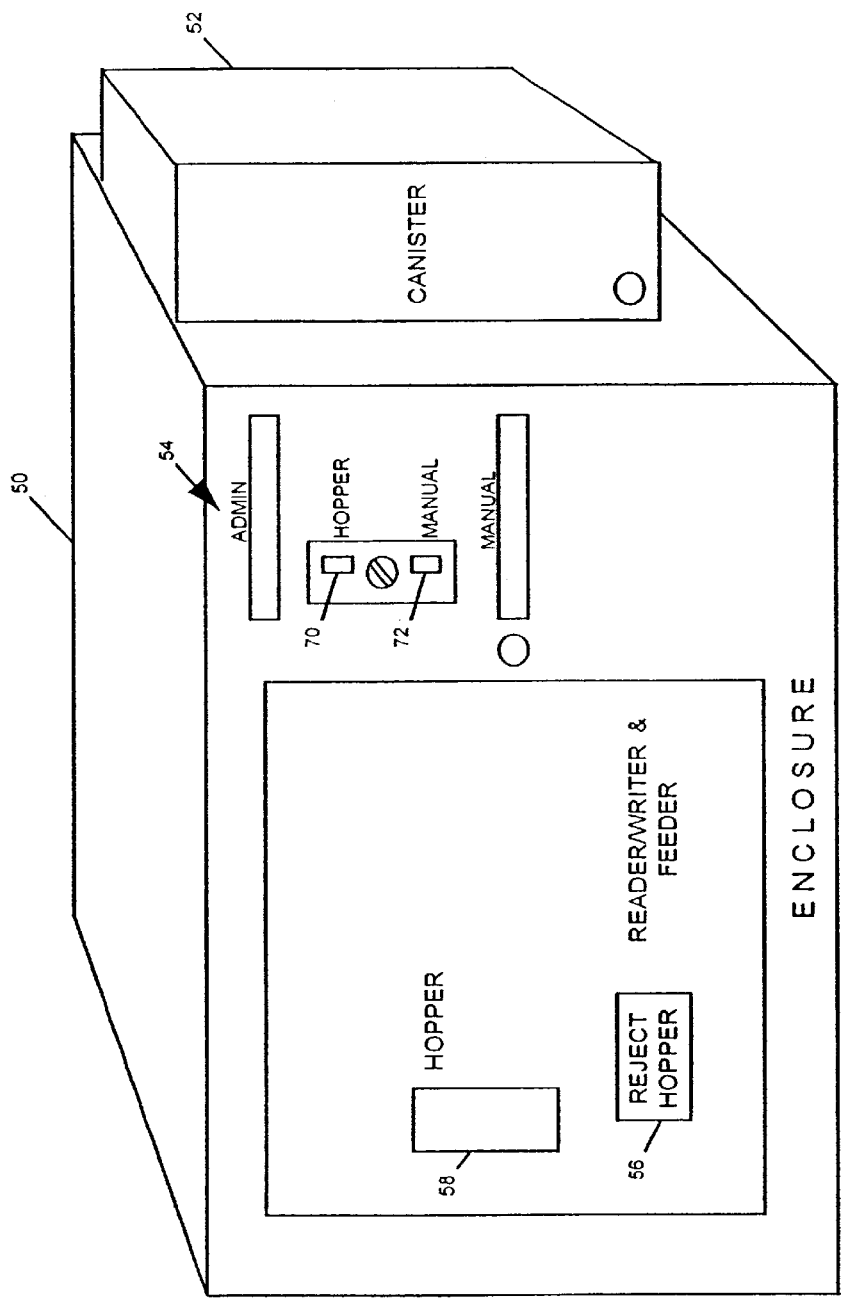
FIG. 6 is a somewhat schematic diagram which provides further detail regarding the transport mechanism shown in FIG. 5 for an embodiment of the present invention.
Figure 7:
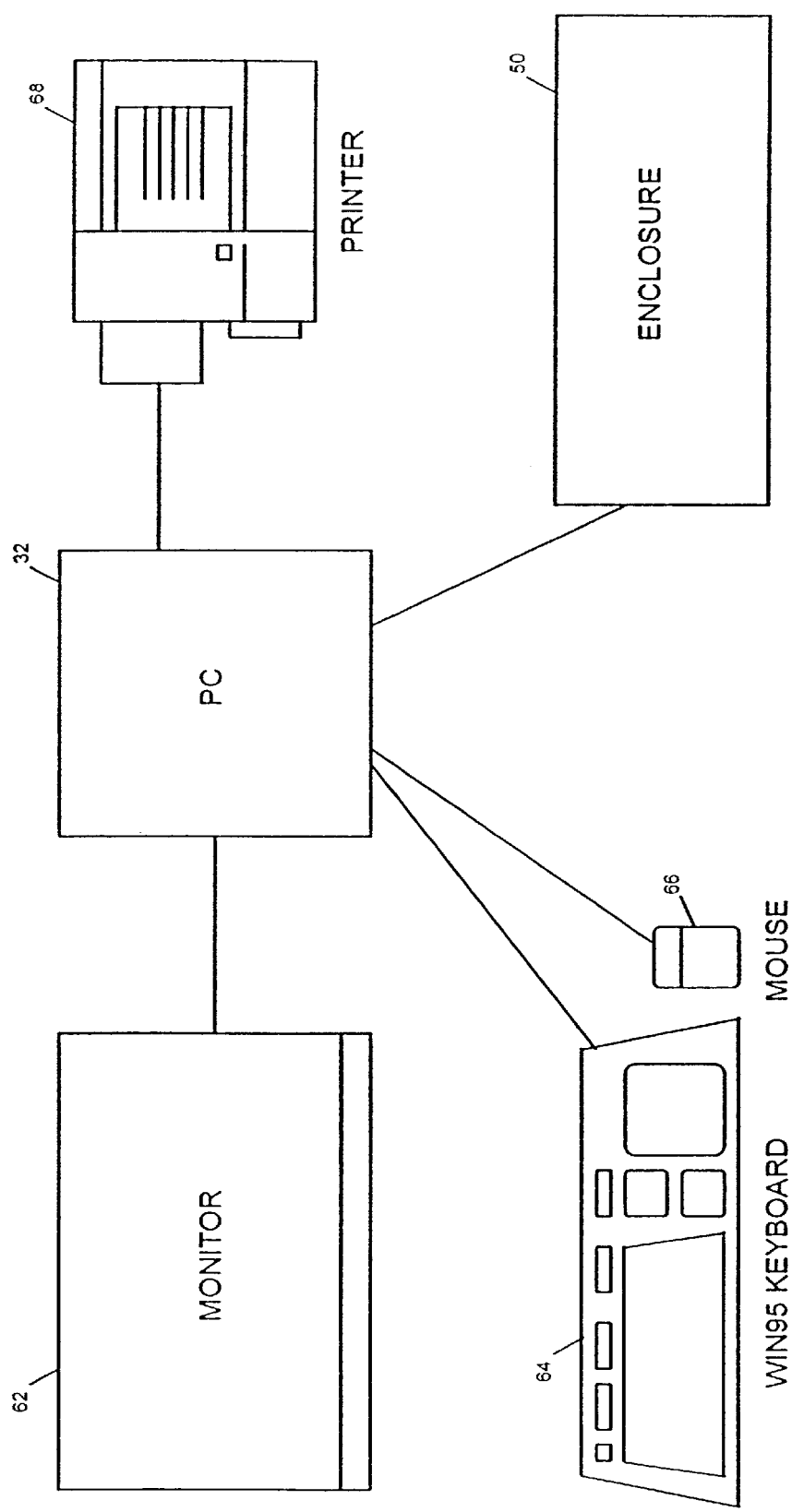
FIG. 7 is a somewhat schematic diagram which provides further detail regarding the components for the process of the transport mechanism automatically feeding stored value cards for off-line batch loading shown in FIG. 5 for an embodiment of the present invention.

FIG. 5 is a schematic flow chart which amplifies the flow of information shown in FIG. 3 and provides further detail regarding the components involved in the process of multiple-card batch loading for an embodiment of the present invention. Referring to FIG. 5, a mechanism 50 is provided to front end the transport. FIG. 6 is a somewhat schematic diagram which provides further detail regarding the transport mechanism or enclosure 50 shown in FIG. 5 for an embodiment of the present invention. FIG. 7 is also a somewhat schematic diagram which provides further detail regarding the components for the process of multiple-card loading illustrated in FIG. 5 for an embodiment of the present invention. Referring to FIGS. 5–7, mechanism 50 includes a card feeder or hopper 52 that allows a stack of cards to be placed in mechanism 50. The PC device 32 permits the addition of the enclosure 50 with a hopper 52 as a peripheral. The PC device 32 has a motorized smartcard reader/writer transport 54 equipped with hoppers 56, 58 to process a pre-determined number of cards per hour. The batch-load terminal 30 with hopper 52 can process a number of stored value cards at a time, although stored value cards can still be processed one at a time for small sessions. For example, a stack of cards are placed in the feeder 50. The same PC system 32 with motorized transport 54 is used, but an automated dial-up terminal emulation application is used to load the cards at a pre-determined rate.

In an embodiment of the present invention, alternatively, a mechanism to front end the transport has a cassette which is loaded with a number of cards and inserted into mechanism 50. Mechanism 50 has a feed hopper 52 and a transport 54 for reading and writing. Mechanism 50 also has a device for rejecting cards into a separate hopper 56. Further, mechanism 50 has an exit collection device 58 for the loaded cards. The PC device 32 which performs the load functions also controls the hopper 52 to feed cards to the read/write smart card station 54 and the exit hopper 58 to collect the loaded cards, and a reject path 56 is provided. The financial institution module 34 is used to store the load key. A load program operates the identified mechanical card transport components and generates the necessary management information systems log files required for the load authorization and funding systems 46.

In an embodiment of the present invention, the separate card reader/writers 36, 60 are replaced with enclosure 54 containing card reader/writers 70, 72. A serial port data switch is used to select either the stored value card reader/writer 72 or the hopper reader/writer 70 to load the stored value cards. The stored value card reader/writer 72 is provided for loading one stored value card at a time. The stored value card hopper reader/writer 70 is provided for loading a plurality of stored value cards. In addition, the stored value card canister 52 is provided for stacking a plurality of loaded stored value cards, and the stored value card reject hopper 56 is provided for stacking a plurality of rejected stored value cards. Hopper 52 supports the automated batch-load of a plurality of standard stored value cards. The hopper reader/writer 70 is not specifically designed to batch-load embossed cards. However, embossed cards can be batch-loaded with the stored value card reader/writer 72.

In an embodiment of the present invention, non-embossed cards are used in card feed mechanism 50, because the embossing does not allow smooth feeding of the cards. While the hopper reader/writer 70 is not specifically designed to batch-load cards embossed, for example, with numerals and account numbers, embossed cards can be batch-loaded with the stored value card reader/writer 72. Embossed cards which are allowed to rub together in feed mechanism 50 can potentially become scratched, which detracts from the value of a card to collector. In the collectors' market, people collect cards similar to the way they collect, for example, stamps. Collectible cards can become worth thousands of dollars if, for example, they have limited issue. Consumers use and collect cards adorned with artwork in the form, for example, of pictures drawn by children, pictures of food, professional sports celebrities, recreation facilities, parks, musicians, historical scenes, post office themes. Such cards are much like stamps in that the condition of the cards is very important.

In an embodiment of the present invention, the cards from the card manufacturer are stored in a vault by the financial institution. As cards are needed, they are put into hopper 52 of the load device 50, and value is put on the cards using the load key. The batch-load terminal 30 batch-loads initial value into reloadable stored value cards. A record is kept of the serial numbers of loaded cards and the load information, and the record is forwarded at 44 to the load authentication system 46. The cards are distributed to various locations for sale by entities which sell the cards, for example, as collector cards to merchants or distributed to bank branches. When cards are sold to collector/merchants or through card dispensing machines or bank branches, reports of the sales are generated. Placing pre-loaded stored value cards in a card dispensing machine permits the card dispensing machine to operate without going on-line for cash transactions.

In an embodiment of the present invention, the financial institution does off-line loading of value to reloadable cash cards prior to issue or sale, provides appropriate management information systems data to the system provider and maintains financial institution contingent and direct liability fund pools up to date. The types of cards include, for example, reloadable cards as well as microprocessor based disposable cards using a special load key which prevents reloading. Reloadable cards include, for example, financial institution-brand only cards and financial institution-brand with co-brand cards. Co-brand cards are jointly marketed, for example, with merchants, cultural organizations, and government institutions such as the post office. The cards are batch-loaded with a specific value for issuance from card dispensing machines, to collector companies, to merchants, and over-the-counter at branches. Any reloadable stored value card loaded by the batch-load terminal can have value subsequently added at any system provider cash load terminal.

In an embodiment of the present invention, the cards are distributed to card dispensing machines. The reloadable chip which can double as a reloadable card or a disposable card provides the ability to load at the time of dispense or sale. A major benefit of using the reloadable chip is that the card has no value until it is loaded, and storage and shipping require minimum security. The load key stored in the card determines whether it is a disposable card or reloadable card. The disposable card has a special load key that is not available for general use on the system provider's system. The reloadable card has the standard load key and can be reloaded. The card dispensing machine has the capability to go on-line to the financial institution for reporting machine status and uploading the dispense transaction log with card serial number and value. The card dispensing machine is essentially like a cigarette vending machine, except that it dispenses cards rather than cigarettes. A customer uses either a debit card, a credit card, or cash in the machine to secure one of the preloaded cards. Card dispensing machines are ideal for dispensing the cards, because they are constructed as a vault to protect the money that is located within the machine, which also protects the cards.

In addition, in an embodiment of the present invention, card dispensing machines can allow combinations of other features relating to the dispensed credit cards, such as personalization of the cards. In this embodiment, such personalization can include, for example, imprinting the card with a personalized photograph or other image selected by the customer.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention. Accordingly, the invention is only limited by the following claims.

What is claimed is:

1. A method of off-line batch loading value to a stored value card application, comprising:

initializing the stored value application of a stored value card with a load key at a centrally located remote location;

allowing the stored value card to be transported in bulk from the remote location to a local batch-load terminal;

allowing secret load key information to be supplied off-line to the local batch-load terminal;

storing the secret load key information in a security module on the local batch-load terminal;

initiating communication at the local batch-load terminal via a card reader device of the local batch-load terminal between the stored value card application and an off-line batch-load application residing on the local batch-load terminal;

automatically transmitting a request for the stored value card application via the card reader device to the off-line batch-load application for a load transaction representing monetary value for the stored value card application using the load key of the stored value card and the secret load key information stored in the security module;

automatically sending a message authorizing the load transaction by the off-line batch-load application residing on the local batch-load terminal to the stored value card application via the card reader device using the load key of the stored value card and the secret load key information securely stored in the security module at the local batch-load terminal, the authorizing message comprising data representing the monetary value;

automatically sending a message confirming completion of the load transaction for the stored value card application via the card reader device to the off-line batch-load application residing on the local batch-load terminal using the load key of the stored value card and the secret load key information stored in the security module; and automatically storing the load transaction completion message by the off-line batch-load application at the local batch-load terminal.

2. The method of claim 1, further comprising automatically feeding a stored value card embedded with the stored value application to the card reader device.

3. The method of claim 1, wherein the stored value application comprises an application residing on a stored value card microprocessor.

4. The method of claim 1, wherein the local terminal comprises a computer.

5. The method of claim 4, wherein the computer comprises a financial institution computer.

6. The method of claim 5 wherein the financial institution computer comprises a bank personal computer.

7. The method of claim 1, wherein the batch-load application comprises an encryption device.

8. The method of claim 1, wherein the batch-load application comprises a CD-ROM.

9. The method of claim 1, wherein transmitting further comprises pre-selecting the monetary value for the load transaction.

10. The method of claim 1, wherein the request comprises an encrypted message.

11. The method of claim 10, wherein the encrypted message comprises the load key information.

12. The method of claim 11, wherein authorizing further comprises decrypting the encrypted message.

13. The method of claim 12, wherein authorizing further comprises validating the load key information.

14. The method of claim 1, wherein authorizing further comprises confirming a funding source.

15. The method of claim 14, wherein the funding source comprises a financial institution.

16. The method of claim 1, wherein the authorizing message further comprises data representing stored value card purchase code information.

17. The method of claim 1, wherein the authorizing message further comprises data representing stored value card serial number information.

18. The method of claim 1, wherein the load key comprises a reloadable load key.

19. The method of claim 1, wherein the load key comprises a non-reloadable load key.

20. The method of claim 1, further comprising reporting the load transaction completion message by the batch-load application.

21. The method of claim 20, wherein reporting comprises collecting the load transaction completion message.

22. The method of claim 21, wherein collecting comprises logging the load transaction completion message in a transaction log.

23. The method of claim 22, wherein collecting further comprises generating the transaction log to a stored value card load transaction file.

24. The method of claim 23, wherein collecting further comprises transmitting the load transaction file to a stored value card system provider.

25. The method of claim 24, wherein collecting further comprises transmitting the load transaction file to a stored value card funding source.

26. The method of claim 25, wherein the funding source comprises a financial institution.

27. The method of claim 26, wherein the financial institution comprises a bank.

28. The method of claim 1 wherein the stored value card is dispensable by a card dispensing machine.

29. The method of claim 28 wherein the card dispensing machine allows personalization of the dispensed stored value card.

30. The method of claim 29 wherein the personalization of the dispensed stored value card includes imprinting the stored value card with a selected image.

31. A system for off-line batch loading value to a stored value card application, comprising:

means for initializing the stored value application of a stored value card with a load key at a centrally located remote location;

a batch-load terminal having a security module for securely storing load key information supplied off-line to the local batch-load terminal;

means for initiating communication at a local batch-load terminal via a card reader device of the local batch-load terminal between the stored value card application on the stored value card transported in bulk from the remote location to the local batch-load terminal and an off-line batch-load application residing on the local batch-load terminal;

means associated with the local batch-load terminal for automatically transmitting a request for the stored value card application via the card reader device to the off-line batch-load application for a load transaction representing monetary value for the stored value card application to the off-line batch-load application using the load key of the stored value card and the secret load key information stored in the security module;

means associated with the off-line batch-load application residing on the local batch-load terminal for automatically sending a message to the stored value card application via the card reader device authorizing the load transaction using the load key of the stored value card and the securely stored load key information;

means for automatically sending a message confirming completion of the load transaction for the stored value card application via the card reader device to the off-line batch-load application residing on the local batch-load terminal using the load key of the stored value card and the secret load key information stored in the security module; and means for automatically storing the load transaction completion message by the off-line batch-load application at the local batch-load terminal.

32. The system of claim 31, further comprising means associated with the card reader for automatically feeding a stored value card imbedded with the stored value application to the card reader.

33. The system of claim 31, wherein the local terminal comprises a computer.

34. The system of claim 33, wherein the computer comprises a financial institution computer.

35. The system of claim 34, wherein the financial institution computer comprises a bank personal computer.

36. A method of off-line batch loading value to a stored value card application, comprising:

initializing the stored value application of a stored value card with a load key at a centrally located remote location;

allowing the stored value card to be transported in bulk from the remote location to a local batch-load terminal;

receiving secret load key information at the local batch-load terminal supplied off-line to the local batch-load terminal;

storing the secret load key information in a security module on the local batch-load terminal;

receiving a request from the stored value card application via a card reader device at the local batch-load terminal for a load transaction representing monetary value by an off-line batch-load application residing on the local batch-load terminal using the load key of the stored value card and the secret load key information stored in the security module;

automatically sending a message authorizing the load transaction by the batch-load application residing on the local batch-load terminal to the stored value card application via the card reader device using the load key of the stored value card and the load key information securely stored in the security module at the local batch-load terminal;

receiving a message by the off-line batch-load application residing on the local batch-load terminal from the stored value card application via the card reader device confirming completion of the load transaction using the load key of the stored value card and the secret load key information stored in the security module; and storing the load transaction completion message by the off-line batch-load application at the local batch-load terminal.

37. A system for off-line batch loading value to a stored value card application, comprising:

means for initializing the stored value application of a stored value card with a load key at a centrally located remote location;

a local batch-load terminal having a security module for securely storing load key information supplied off-line to the local batch-load terminal;

means for receiving a request from the stored value card application on the stored value card transported in bulk from the remote location to the local batch-load terminal via a card reader device at a local batch-load terminal for a load transaction representing monetary value by an off-line batch load-application residing on the local terminal using the load key of the stored value card and the secret load key information stored in the security module;

means for automatically sending a message authorizing the load transaction by the off-line batch-load application residing on the local batch-load terminal to the stored value card application via the card reader device using the stored value card application and the securely stored load key information;

means for receiving a message by the off-line batch-load application residing on the local batch-load terminal from the stored value application via the card reader device confirming completion of the load transaction using the load key of the stored value card and the secret load key information stored in the security module; and means for storing the load transaction completion message by the off-line batch-load application at the local batch-load terminal.

* * * * *

UNITED STATES PATENT AND TRADEMARK OFFICE
Certificate

Patent No. 6,422,459 B1

Patented: July 23, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Joseph C. Kawan, Hollywood, CA (US); Mark kogen, Lawndale, CA (US); Warren Yung-Hang Tan, Thousand Oaks, CA (US); Miguel Abramowicz, Huntington Beach, CA (US); and Marc Andio Guzman, Studio City, CA (US).

Signed and Sealed this Third Day of April 2007.

MICHAEL G. LEE
*Supervisory Patent Examiner*
Art Unit 2876